S. A. Jefferson,
Cultivator.
No. 108358. Patented Oct. 18, 1870.
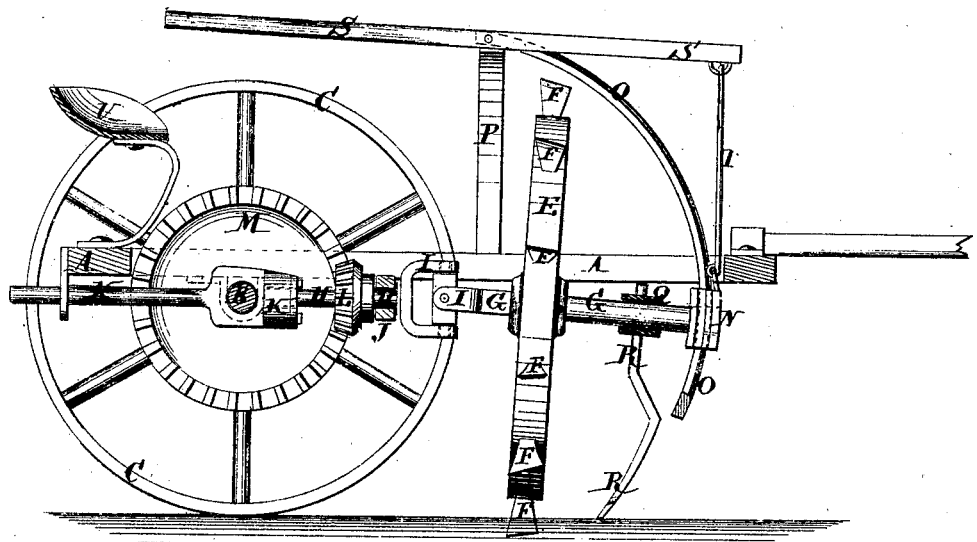
Fig: 2.
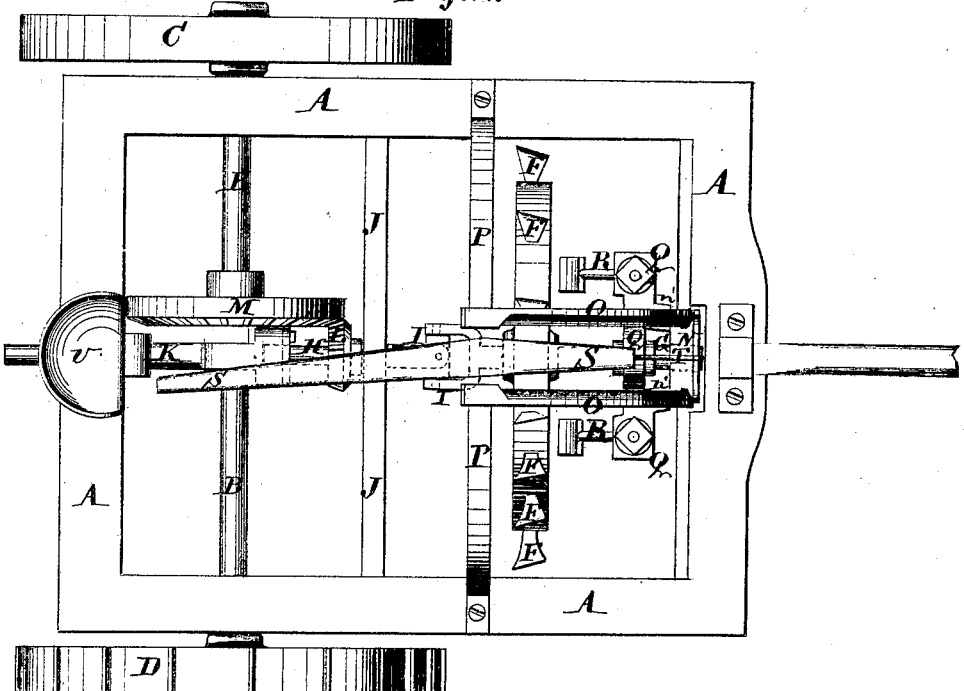
Witnesses
M. Vorland
G. S. Mabee
Inventor
S. A. Jefferson
per: Munn & Co.
Attorneys

UNITED STATES PATENT OFFICE.

STILLMAN A. JEFFERSON, OF FRANKLIN, TENNESSEE.

IMPROVEMENT IN SELF-ADJUSTING ROTARY COTTON-CHOPPERS.

Specification forming part of Letters Patent No. 108,358, dated October 18, 1870.

*To all whom it may concern:*

Be it known that I, STILLMAN A. JEFFERSON, of Franklin, in the county of Williamson and State of Tennessee, have invented a new and useful Improvement in Self-Adjusting Rotary Cotton-Choppers; and I do hereby declare that the following is a full, clear, and exact description thereof, which will enable others skilled in the art to make and use the same, reference being had to the accompanying drawings, forming part of this specification, in which—

Figure 1 is a detail vertical longitudinal section of my improved machine. Fig. 2 is a top view of the same.

Similar letters of reference indicate corresponding parts.

My invention has for its object to furnish a rotary horse-hoe or cotton-chopper which shall be so constructed and arranged as to adapt itself to any inequalities of the ground, and which can be used twice upon the same crop; and it consists in the construction and combination of various parts of the machine, as hereinafter more fully described.

A is the frame of the machine, which should be widened in front of the wheels, to give space for the hoes to revolve fully. The frame A rides upon the axle B, which revolves in bearings attached to said frame.

C and D are the wheels, one of which, as C, revolves freely upon the axle B, and the other, as D, is keyed to or otherwise rigidly connected with the axle B, so as to carry said axle with it in its revolution.

E is a wheel or drum placed transversely in the forward part of the frame A, and to the rim of which the hoes or cutters F are detachably secured. The hoes or cutters for the first chopping may be twelve hoes one inch wide, or twenty-four hoes one-half an inch wide, and for the second chopping the hoes may be four or two inches wide. The number or size of the hoes F may be varied as may be desired. The wheel or drum E is keyed or otherwise rigidly attached to a shaft, G, the rear end of which is connected with the forward end of the shaft H by a universal joint, I, which has washers placed upon its coupling-pin upon each side of the block, to prevent the parts of the point I from slipping, while allowing it to work freely. The forward part of the shaft H revolves in bearings in and is supported by a cross-bar, J, the ends of which are securely attached to the side bars of the frame A. The rear end of the shaft H is swiveled to the forward end of the bar K, which has a hole formed through it for the passage of the axle B, so that the said bar may ride upon and be supported by the said axle B. The rear end of the bar K extends back to and is connected with the rear part of the frame A, to hold it in proper position.

To the shaft H is attached a small gear-wheel, L, the teeth of which mesh into the teeth of the large gear-wheel M, keyed or otherwise rigidly attached to the axle B, so that the cutters or choppers may be operated by the advance of the machine. The forward end of the shaft G revolves in the head-block N, which slides up and down upon the curved or arched guides O, attached to the front cross-bar of the frame A, and the upper ends of which are supported by a cross or brace bar, P, the ends of which are attached to the side bars of the frame A.

Q is a yoke or bar, through a hole in which the forward part of the shaft G passes, and which is connected with the sliding head-block N by the arms n', formed upon or attached to said head-block.

R are the gages by which the depth at which the choppers or hoes work in the ground may be regulated. The lower ends of the gages R are made broad, and are inclined to the rearward, so as to slide over the surface of the ground. The upper ends of the gages R pass up through holes in the ends of the bar or yoke Q, to which they are secured by bolts and washers, so that by varying the thickness of said washers, or by placing them above or below the bar or yoke Q, the gages R may be adjusted to cause the hoes or choppers F to work deeper or shallower in the ground.

To the upper ends of the curved guides O is pivoted the lever S, the forward end of which is connected with the sliding head N by a rod or chain, T, and the rear end of which extends back into such a position that it may be conveniently reached and operated by the driver from his seat U, to raise the cutter-wheel and cutters E F away from the ground when desired.

Having thus described my invention, I claim as new and desire to secure by Letters Patent—

1. The combination of the sliding head-block N, curved guides O, shafts G H, wheel E F, and lever S, all arranged substantially as shown and described, for the purpose specified.

2. The combination of the adjustable gages R with the bar or yoke Q, sliding head-block N, shaft G, and cutter wheel or drum E F, substantially as herein shown and described, and for the purpose set forth.

STILLMAN A. JEFFERSON.

Witnesses:
   WM. CUMMINS,
   W. A. MOSS.